United States Patent Office 2,788,324
Patented Apr. 9, 1957

2,788,324

PLAIN BEARINGS OR ANTI-FRICTION ELEMENTS

David Mitchell, Alperton, Wembley, England, assignor to The Glacier Metal Company Limited, Alperton, Wembley, England, a British company No Drawing. Application December 28, 1953, Serial No. 400,803

Claims priority, application Great Britain January 23, 1953

2 Claims. (Cl. 252—12.2)

This invention relates to plain bearings, such as journal bearings or bearing liners, thrust bearings or the like.

It has before been proposed to provide a bearing bush or liner with a working surface of, or incorporating, poly-tetra-fluoro-ethylene, and it has been found that, within limits, such bearings will function effectively without lubrication.

Furthermore, it has been proposed to provide a working surface of a bearing or journal with an impregnation or bearing surface film of molybdenum disulphide for the same purpose.

The loads and speeds at which plain bearings having a working surface of, or incorporating, poly-tetra-fluoro-ethylene can be effectively employed are limited by the incidence of pick-up, i. e. local welding at high spots between the journal surface and the metal matrix in which the poly-tetra-fluoro-ethylene is incorporated. It has been found that incidence of pick-up can be deferred to higher speeds and loads if thin protective films of a pickup discouraging substance are formed and maintained on the metal surface.

The present invention has for its object to provide an improved plain bearing element, or material for the manufacture thereof, incorporating poly-tetra-fluoro-ethylene.

The term "non-carbonaceous solid lubricant" used herein means a substance which contains no carbon, is solid up to at least 50° C., does not decompose unduly at 350° C., readily forms smears on metal surfaces and, when tested on a dynamic friction testing machine between two metal surfaces, shows a coefficient of friction below 0.15.

According to the present invention, a plain bearing comprises a metallic structure having at least at the surface pores, cavities or the like filled with a mixture of poly-tetra-fluoro-ethylene with a limited proportion of a non-carbonaceous solid lubricant as above defined capable of discouraging local welding.

The invention includes a plain bearing element comprising a porous metallic structure impregnated with the said mixture.

The said non-carbonaceous solid lubricant may be selected from the sulphides, selenides and tellurides of molybdenum, tungsten and titanium, lead di-iodide and boron nitride. Molybdenum disulphide has a lamellar structure capable of forming thin protective films of great strength on metal surfaces and is preferred for the purpose, but any other substance, for example, tungsten disulphide, boron nitride or the like having similar structure and properties may be utilised in place of molybdenum disulphide. The mixture may include up to about 20% by weight of the non-carbonaceous solid lubricant.

The said porous metallic structure may be of the kind produced by sintering metallic powders to produce a porous sponge structure, for instance, of copper, copper-tin, copper-lead or copper-lead-tin. Particularly in the case of journal bearings, the sintered metallic structure may be bonded to a steel or other relatively strong backing, but for floating bearings or thrust washers, the porous metallic structure is impregnated on both faces with the said mixture.

The mixture of poly-tetra-fluoro-ethylene and non-carbonaceous solid lubricant may be applied by spreading a mixture of the finely powdered substances on the metal surface and forcing it into the pores, cavities or the like by the application of pressure with or without heat. Alternatively, the mixture may be applied in the form of a foil which is laid on the metal surface and subjected to heat and pressure to force the mixture into the pores, cavities or the like. The mixture also may be applied in suspension in a suitable carrier, impregnation of the pores, cavities or the like in the metal surface being effected under alternate applications of partial vacuum and atmospheric or super-atmospheric pressure or by centrifugal action, and the impregnated material being finally subjected to heat treatment to cure the mixture and, if desired, to the application of pressure to consolidate the mixture into the pores, cavities or the like in the metallic structure. Advantageously, the incorporation or impregnation is carried out in such manner that a superficial film of the mixed substances extends over the surface of the metallic structure.

In carrying the invention into effect according to one embodiment, and in the application of the invention to a plain bearing comprising a porous bronze bonded to a steel backing, a steel strip is copper-plated and spread with a layer of 89:11 copper-tin alloy spherical powder of such particle size that all will pass through a 100 mesh screen and less than 5% through a 150 mesh screen. The powder is spread to a depth of about 0.010" and is sintered in an atmosphere of cracked ammonia to form a porous bronze layer firmly bonded to the steel strip, the porous bronze layer having a pore volume of about 30%.

A mixture of finely powdered poly-tetra-fluoro-ethylene and non-carbonaceous solid lubricant in the proportion of 5 parts by weight of poly-tetra-fluoro-ethylene to 1 part by weight of the non-carbonaceous solid lubricant, e. g. molybdenum disulphide, is spread onto the porous metal surface and forced into the pores by the application of heat and pressure, e. g. 6 tons per square inch at 350° C.

In a modification, the mixture may be applied on the porous metal surface in the form of foil and forced into the pores by heat and pressure as above described. The foil may be produced by shaving from a block formed by moulding a mixture of finely powdered poly-tetra-fluoro-ethylene and non-carbonaceous solid lubricant at a temperature of 350° C. at a pressure of 0.5 ton per square inch, while maintained in a mould for a period of about one hour, the block being allowed to cool slowly to room temperature while maintaining the pressure.

In a further modification, the porous bronze layer may be impregnated with a mixture of commercial suspensions, e. g. in alcohol or water, of poly-tetra-fluoro-ethylene and a non-carbonaceous solid lubricant, such as molybdenum disulphide, the mixture being such that the substances are in about the same ratio as referred to above. The impregnation may be carried out in any suitable manner, such as by repeated treatment involving the application of partial vacuum and atmospheric or super-atmospheric pressure, and the material being finally heated to about 350° C. for about 2 minutes to cure the mixture.

Plain bearings in the form of journal bearings or bearing liners, thrust bearings or the like may be produced from the impregnated material in any suitable manner.

In the application of the invention to floating bearings or thrust washers, a porous bronze layer is produced in any suitable manner by sintering metallic powders, and the porous structure is impregnated with the mixture of poly-tetra-fluoro-ethylene and molybdenum disulphide, for example, in the manner above described, the mixture being applied to both surfaces of the material and preferably in such manner that on each surface there is a superficial layer of the mixed substances.

It will be understood that the invention is not limited to the particular embodiments hereinbefore described. For example, the metallic structure for receiving the mixed substances may be otherwise formed with a porous, creviced or other suitable receptive surface or with cavities, pockets, or the like in the surface for the reception of the mixed substances.

What I claim is:

1. A plain bearing structure consisting essentially of a porous metallic matrix body composed of sintered-together metallic particles selected from the group consisting of copper, copper-tin, copper-lead and copper-lead-tin, the pores of a face of which are filled with, and said face is covered with a film of, a mixture consisting predominantly of polytetrafluoroethylene admixed with a significant amount not exceeding about 20% by weight of a non-carbonaceous solid lubricant selected from the group consisting of the sulphides, selenides and tellurides of molybdenum, tungsten and titanium, lead di-iodide and boron nitride.

2. A plain bearing structure as defined in claim 1, in which the pores of the matrix body are filled with, and said face is covered with a film of, a mixture of polytetrafluoroethylene and molybdenum disulphide in the approximate proportion of 5 to 1.

References Cited in the file of this patent
UNITED STATES PATENTS

| | | |
|---|---|---|
| 2,187,086 | Koehring | June 16, 1940 |
| 2,207,961 | Wellman | July 16, 1940 |
| 2,214,104 | Hildabolt | Sept. 10, 1940 |
| 2,585,430 | Boegehold | Feb. 12, 1952 |
| 2,686,155 | Willis et al. | Aug. 10, 1954 |
| 2,691,814 | Tait | Oct. 19, 1954 |